US011706078B1

(12) United States Patent
Clark et al.

(10) Patent No.: US 11,706,078 B1
(45) Date of Patent: Jul. 18, 2023

(54) INTERNET DISRUPTION DETECTION

(71) Applicant: Two Six Labs, LLC, Arlington, VA (US)

(72) Inventors: Chae A. Clark, Arlington, VA (US); Robert P. Gove, Jr., Reston, VA (US); Violet Lingenfelter, Arlington, VA (US); Anthony Wong, Arlington, VA (US)

(73) Assignee: Two Six Labs, LLC, Arlington, VA (US)

( * ) Notice: Subject to any disclaimer, the term of this patent is extended or adjusted under 35 U.S.C. 154(b) by 82 days.

(21) Appl. No.: 17/207,985

(22) Filed: Mar. 22, 2021

(51) Int. Cl.
| | |
|---|---|
| *H04L 41/06* | (2022.01) |
| *H04L 41/0677* | (2022.01) |
| *H04L 41/12* | (2022.01) |
| *H04L 43/50* | (2022.01) |

(52) U.S. Cl.
CPC .......... *H04L 41/06* (2013.01); *H04L 41/0677* (2013.01); *H04L 41/12* (2013.01); *H04L 43/50* (2013.01)

(58) Field of Classification Search
CPC ..... H04L 41/06; H04L 41/0677; H04L 41/12; H04L 43/50
See application file for complete search history.

(56) References Cited

U.S. PATENT DOCUMENTS

| | | | | |
|---|---|---|---|---|
| 8,626,678 B2* | 1/2014 | Baltatu | ............... | G06F 18/2433 706/12 |
| 9,729,414 B1* | 8/2017 | Oliveira | .............. | H04L 43/0805 |
| 10,567,922 B2 | 2/2020 | Knebl et al. | | |
| 10,771,313 B2* | 9/2020 | Tedaldi | ............... | H04L 41/5025 |
| 11,073,596 B1 | 7/2021 | Covaliov et al. | | |
| 2005/0198269 A1* | 9/2005 | Champagne | ............ | H04L 45/00 709/224 |
| 2009/0196184 A1* | 8/2009 | Rajan | ..................... | H04L 45/123 370/238 |
| 2010/0030544 A1* | 2/2010 | Gopalan | ............... | H04L 41/142 703/13 |
| 2015/0199224 A1* | 7/2015 | Mihnev | .................. | H04L 41/142 714/37 |
| 2022/0114457 A1* | 4/2022 | Schradin, III | ........... | G06N 5/04 |

OTHER PUBLICATIONS

Huang, et al. "Diagnosing Network Disruptions with Network-Wide Analysis", Sigmetrics 07, Jun. 12-16, 2007, pp. 1-12.

\* cited by examiner

*Primary Examiner* — Aftab N. Khan
*Assistant Examiner* — Patrick F Ngankam
(74) *Attorney, Agent, or Firm* — Armis IP Law, LLC

(57) ABSTRACT

A network disruption detection engine gathers and stores network routing path update messages that routinely modify routing tables used by internet routers for transporting message traffic between a source and a destination. Routing path messages continually maintain a network transport infrastructure both for intranets used for particular entities such as corporations, and internet traffic between arbitrary source and destination nodes. Major disruptions or outages typically result in an increase in routing path messages, typically focused on a particular set, region or network entity where the disruption occurred, as other routing entities seek to avoid the troubled region. Analysis of this sudden activity of routing messages and extracting message content about the network region they seek to avoid allows identification and queries of a widespread network outage.

19 Claims, 7 Drawing Sheets

INTERNET DISRUPTION DETECTION

STATEMENT REGARDING FEDERALLY SPONSORED RESEARCH AND DEVELOPMENT

This invention was made, at least in part, with government support under Contract No. 70RSAT18CB0000018DHS, awarded by the Science and Technology Directorate. The Government has certain rights in the invention.

BACKGROUND

Internet services, such as internet service providers (ISPs) or content providers like Netflix® or Twitter®, often experience disruptions. Internet users often want to know whether a disruption is localized, affecting only themselves, or if the disruption is wider spread, affecting all users of the service or an entire geographic area. These disruptions can be caused by many things, such as fiber cuts, misconfigurations, internet traffic routing errors, cyber attacks, firewalls in authoritarian countries, or hardware or software failures.

SUMMARY

A network disruption detection engine gathers and stores network routing path update messages that routinely modify routing tables used by internet routers for transporting message traffic between a source and a destination. Routing path messages continually maintain a network transport infrastructure both for intranets used for particular entities such as corporations, and internet traffic between arbitrary source and destination nodes. Major disruptions or outages typically result in an increase in routing path messages, typically focused on a particular set, region or network entity where the disruption occurred, as other routing entities seek to avoid the troubled region. Analysis of this flurry of routing messages and extracting message content about the network region they seek to avoid allows identification and queries of a widespread network outage.

Configurations herein are based, in part, on the observation that the complexity and automated, self-healing redundancy of modern network technology has become largely expected. Available Internet access is presumed, in many parts of the world, to be as readily available as running tap water. Unfortunately, conventional approaches to network disruption and outage detection suffer from the shortcoming that localization of network problems often rely on hearsay reporting based on symptoms reported by others, rather than by actual causal identification. Social media messaging from affected users is a prominent reporting means, unless of course, the outage hampers the same transport resources invoked by the aggrieved social media users.

Accordingly, configurations herein substantially overcome the above described shortcomings by receiving and gathering actual routing path messages used to update advertised routes between network entities. Ongoing historical data about network transmission paths is maintained, and a deviant anomaly in the routing path messages is employed to qualify a suspected or possible outage. Comparison of current routing path messages with a recent history indicates when a sudden burst of activity advertises routes around a particular internet entity such as a geographical region or corporate entity.

Conventional approaches use features such as traceroute messages and fusing of data from multiple routers to probe and "home in" on possible problem areas. These approaches effectively present a trial-and-error strategy for mitigation following an adverse event, rather than proactively characterizing normal, non-problematic activity prior to disruptions for defining a baseline for comparison once adverse events begin to emerge.

Some conventional approaches look for a preponderance of user reports on social media and messaging platforms. Certain websites employ mining techniques on popular platforms such as Twitter®, and mine for service names and certain keyworks, e.g. "Netflix® is down." Such indirect approaches have several problems. First, if Twitter itself is down then no one can search for tweets mentioning the names of services. Second, general internet disruption is difficult to identify because it does not affect specific internet services or content providers. Third, these methods only show the number of user complaints, and they do not identify whether something is actually disrupted, or even if it is part of a broader set of related disruptions.

In further detail, configurations herein present a method of identifying and reporting network anomalies by receiving a plurality of routing path messages indicative of available network paths between network entities, and identifying, based on analyzing the plurality of routing path messages, an anomaly in an available network path. Normal network operation involves many non-user traffic messages between routers for maintaining a proper routing infrastructure. These anomalies cause network traffic between autonomous systems (AS) to follow a different path. A gathering application aggregates the plurality of routing path messages concerning anomalies received during a plurality of time intervals. An analyzing application compares the anomalies in each time interval of the plurality of time intervals to the anomaly in the others of the plurality of time intervals, and concludes, based on the comparison, whether a difference in the anomalies is indicative of a network disruption.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
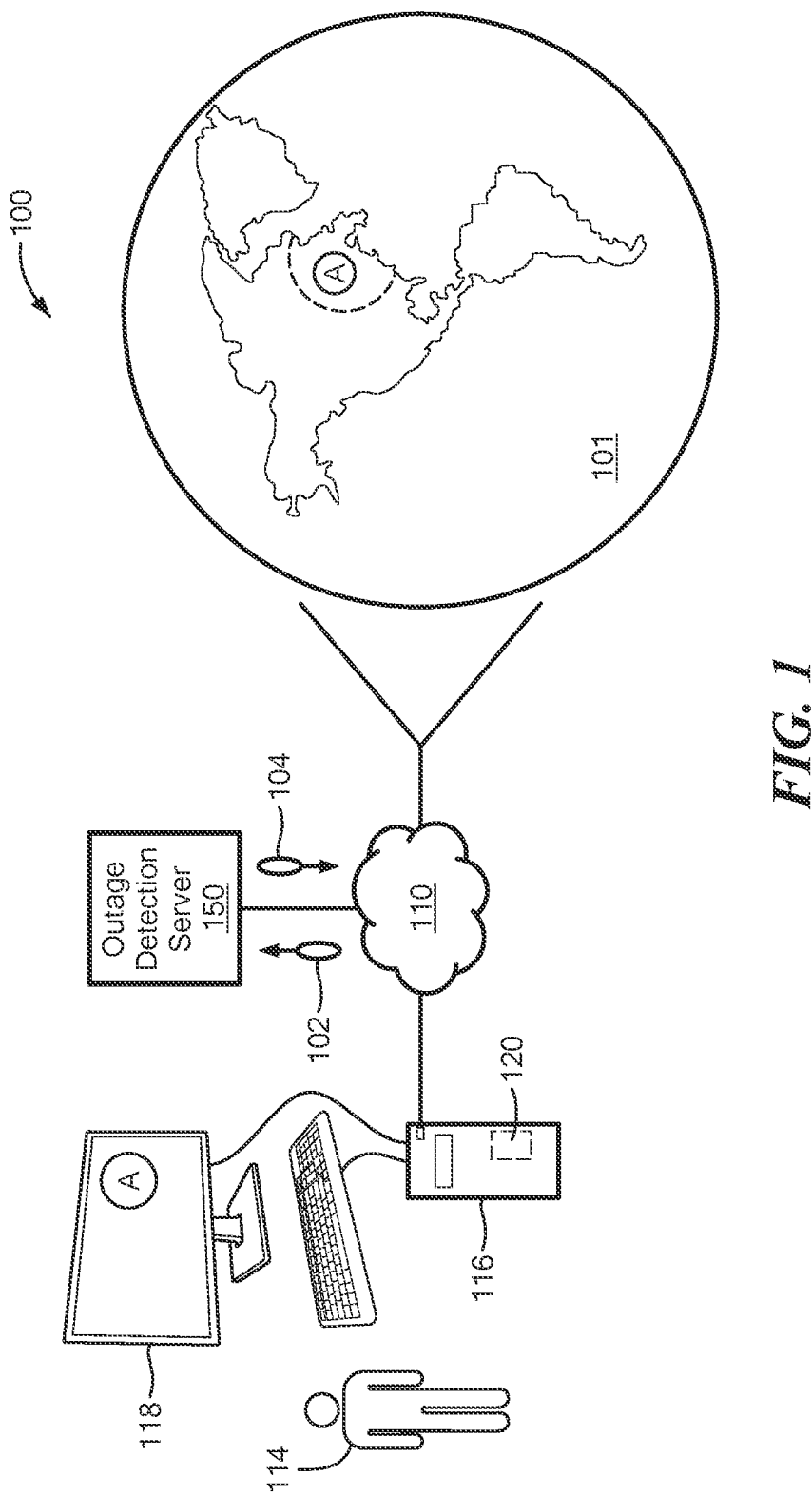
FIG. 1 is a context diagram of a network environment suitable for use with configurations herein.

In the discussion that follows, an example of aggregating and analyzing routing messages between routers, rather than interrogating user message traffic, identifies router activities, trends and disruption which rise to a level of a significant service outage affecting a number of subscribers and users. Most of the disclosed operation employs routing activities on the Internet, however the disclosed principles based on router control messages are applicable to any suitable routing and messaging environment, intranet, LAN (Local Area Network), WAN (Wide Area Network) or other network architecture.

It may be beneficial to briefly discuss typical network infrastructure upon which the disclosed approach operates. In a packet switched network protocol, messages are passed between routing devices, generally called nodes, in a series of hops between a source and a destination. A body of transmitted data is broken down into a series of packets, and each packet include portions of a message, or payload, along with routing information indicating the destination and order of the packets. The routing information tells each routing entity where to send the message for the next hop. Upon arrival at the destination, the complete body of transmitted data (such as a file) is reassembled from the payloads.

Each router has a routing table, which tells the router where to send the message for the next hop based on the destination. In a large network such as the Internet, a substantial number of routing hops may be considered. A series of hops between nodes defines a routing path. Since individual nodes may be brought on and offline, and the physical linkages between them may experience failure or overload, the routing tables are continually updated by a series of control messages. These control messages differ from data messages transporting user data payloads, and keep the routing tables maintained with the best path between a source and destination.

In a typical Internet configuration, the control messages for specifying paths include routing path messages based on an established Border Gateway Protocol (BGP) and Classless Inter-Domain Routing (CIDR) messages, which update the routing table and related information at each node. A certain throughput of routing path messages is normal, even in a healthy network, as minor disruptions are accommodated. A major transmission interruption, however, will result in a substantial increase in the number of routing path messages and the affected addresses of the destinations affected. A level of disruption activity leading to a service outage is determined based on comparison with the messaging activity of previous time periods of normal operation.

Routing path messages include BGP and CIDR messages. The job of the Border Gateway Protocol is to facilitate the exchange of route information between the nodes, or BGP devices, so that each router can determine efficient routes to each of the networks on an IP internetwork. This means that descriptions of routes are the key data that BGP devices work with. Every BGP node, or speaker, is responsible for managing route descriptions according to specific guidelines established in the BGP standards.

FIG. 1 is a context diagram of a network environment 100 suitable for use with configurations herein. In the network environment, a network 110 such as the Internet services a geographic region 101 with internet services for transmission and receipt of data on behalf of a plurality of users. Each user 114 employs a computing device 116 including a rendering screen 118 for sending and receiving information pertaining to web services via the network 110. The computing device 116 includes any network conversant device such as cellphone, tablets, laptops, smartphones and any other mobile or desktop device. The internet services include any network activity such as browsing, multimedia streaming, application download and execution and any other computing task involving message based traffic over the network 110.

In configurations herein, the computing device 116 includes an outage detection application 120, which identifies an outage or service disruption in an entity or region A of a service area of the network, and reports on the entity or region A via a GUI on the rendering screen 118. A user request 102 about outage status may be received by an outage detection server 150, and a outage report 104 returned, via the system, methods and devices described further below.

The BGP protocol as defined herein is typically used between so-called edge routers. Edge routers delineate an Autonomous System (AS) from the Internet as a whole. An AS is a group of one or more IP prefixes (lists of IP addresses accessible on a network) run by one or more network operators that maintain a single, clearly-defined routing policy. Network operators need Autonomous System Numbers (ASNs) to control routing within their networks and to exchange routing information with other Internet Service Providers (ISPs).

The routing path messages therefore include Border Gateway Protocol (BGP) messages indicative of paths between a plurality of autonomous systems (AS), and Classless Inter-Domain Routing (CIDR) messages indicative of ranges of internet addresses sharing a routing path. Analysis of disruptions and outages further includes determining an anomaly from a change in an availability of a path to a destination AS of the plurality of autonomous systems, and determining an anomaly from a change in a range of internet addresses reachable by routing through a transit AS of the plurality of autonomous systems.

Figure 2:
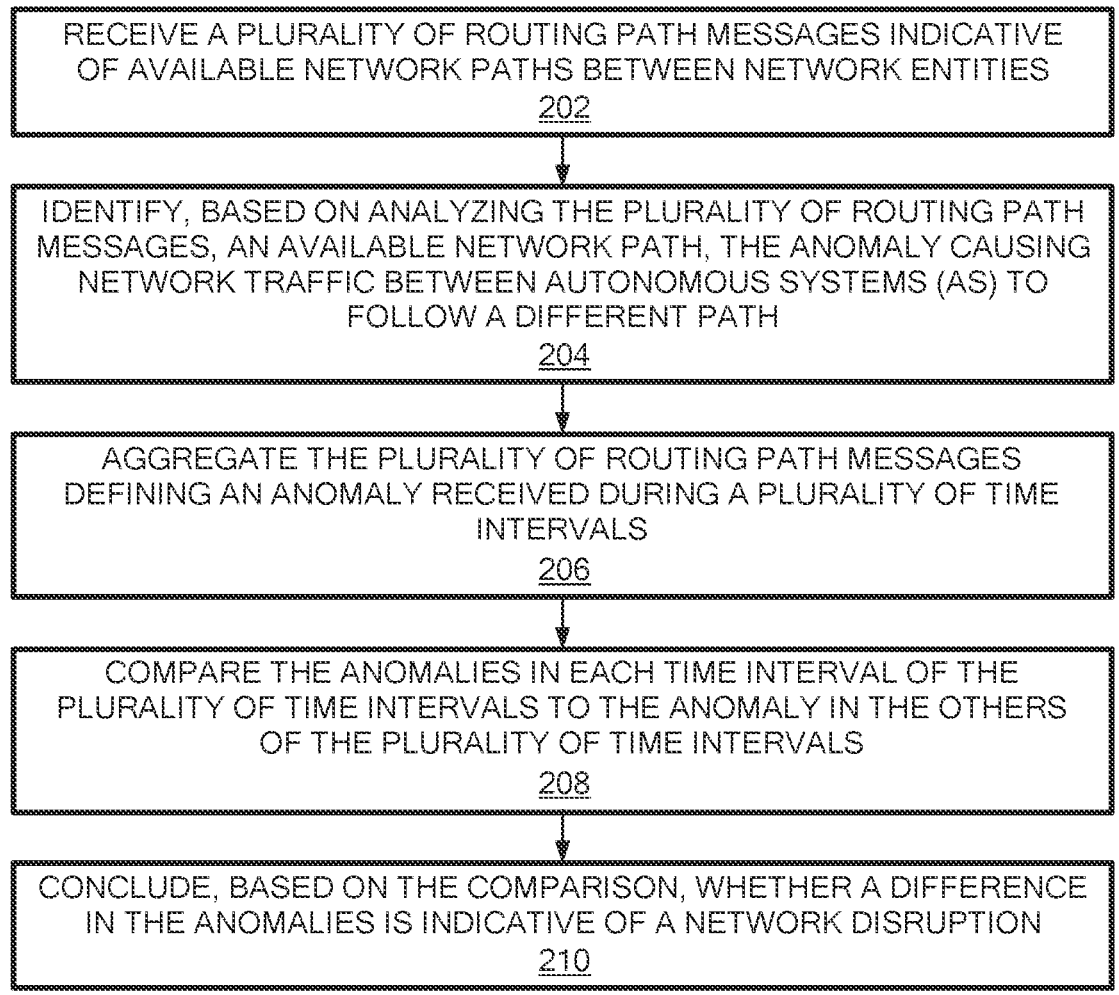
FIG. 2 is a flowchart of network interruption detection and identification in the environment of FIG. 1.

FIG. 2 is a flowchart of network interruption detection and identification in the environment of FIG. 1. Referring to FIGS. 1 and 2, internet routing information is available from several sources. The disclosed approach primarily collects data from two open BGP data archives in near-realtime. These sources include the RIPE NCC (Réseaux IP Européens Network Coordination Centre) and Route Views (University of Oregon Route Views Project). Other suitable data source may be employed for gathering and coalescing data as described further below.

The RIPE NCC collects and stores Internet routing data from several locations around the globe, using the Routing Information Service (RIS), established in 2001. The Route Views project was originally conceived as a tool for Internet operators to obtain real-time BGP information about the global routing system from the perspectives of several different backbones and locations around the Internet.

BGP keeps track of internet traffic routing paths and CIDR block ownership by ASNs. Due to BGP's age and ubiquitous use, particular configurations may include sensors placed at specific locations to allow for recording of broadcast traffic. This can be used to monitor the health of the Internet as a whole, and detect network disruptions when present based on reduced message flow.

In the configurations discussed further below, the method of identifying and reporting network anomalies includes, at step 202 receiving a plurality of routing path messages, such that the routing path messages are indicative of available network paths between network entities. The routing information is obtained either directly from BGP/CIDR messages or indirectly from databases storing the routing information, as discussed above. Anomalies in an available network path are identified, based on analyzing the plurality of routing path messages, in which the anomaly causes network traffic between autonomous systems (AS) to follow a different path, as depicted at step 204. An anomaly may be only a single router being removed or corrupted, or may be a larger disruption causing a substantial outage to many users. The approach aggregates the plurality of routing path messages defining an anomaly that are received during a plurality of time intervals, as shown at step 206. An analysis engine compares the anomalies in each time interval of the plurality of time intervals to the anomaly in the others of the plurality of time intervals, as depicted at step 208, and concludes, based on the comparison, whether a difference in the anomalies is indicative of a network disruption, as disclosed at step 210. In general, current routing path messages are compared to a history of routing path messages for identifying an outlier in a typical pattern of message flow and routing changes.

The analysis engine employs machine learning to measure anomalousness of logical and geographic regions of the Internet using border gateway protocol (BGP) route updates and CIDR route information. A disruption report generator identifies groups of countries, cities, and/or organizations experiencing a related internet disruption.

Reports generated to the user take the form of a dashboard composed of:

A) A component showing overall disruptions over time by number of IP addresses, number of cities, and number of organizations over time. Users can select a time range for this component and all the other components will update to show data for the selected time range.

B) A component showing the level of disruption of geographic regions (e.g. countries) for the selected time range; and C) A component showing the top most disrupted countries, cities, and organizations for the selected time range. This can be filtered to show specific countries, cities, and organizations. Users can also click on a country, city, or organization and the system will automatically show countries, cities, and organizations with similar patterns of disruption.

The disclosed approach differs from conventional network management in at least several ways:

It directly detects disruptions in the internet instead of relying on users to report disruptions.

It enables users to identify temporal relationships between disruptions in countries, cities, and organizations (e.g. ISPs).

It enables users to see disruptions that are related both temporally and geographically.

The approach examines BGP announced route lengths (among other features) for each AS and applies an anomaly detection algorithm to identify disruptions.

Figure 3:
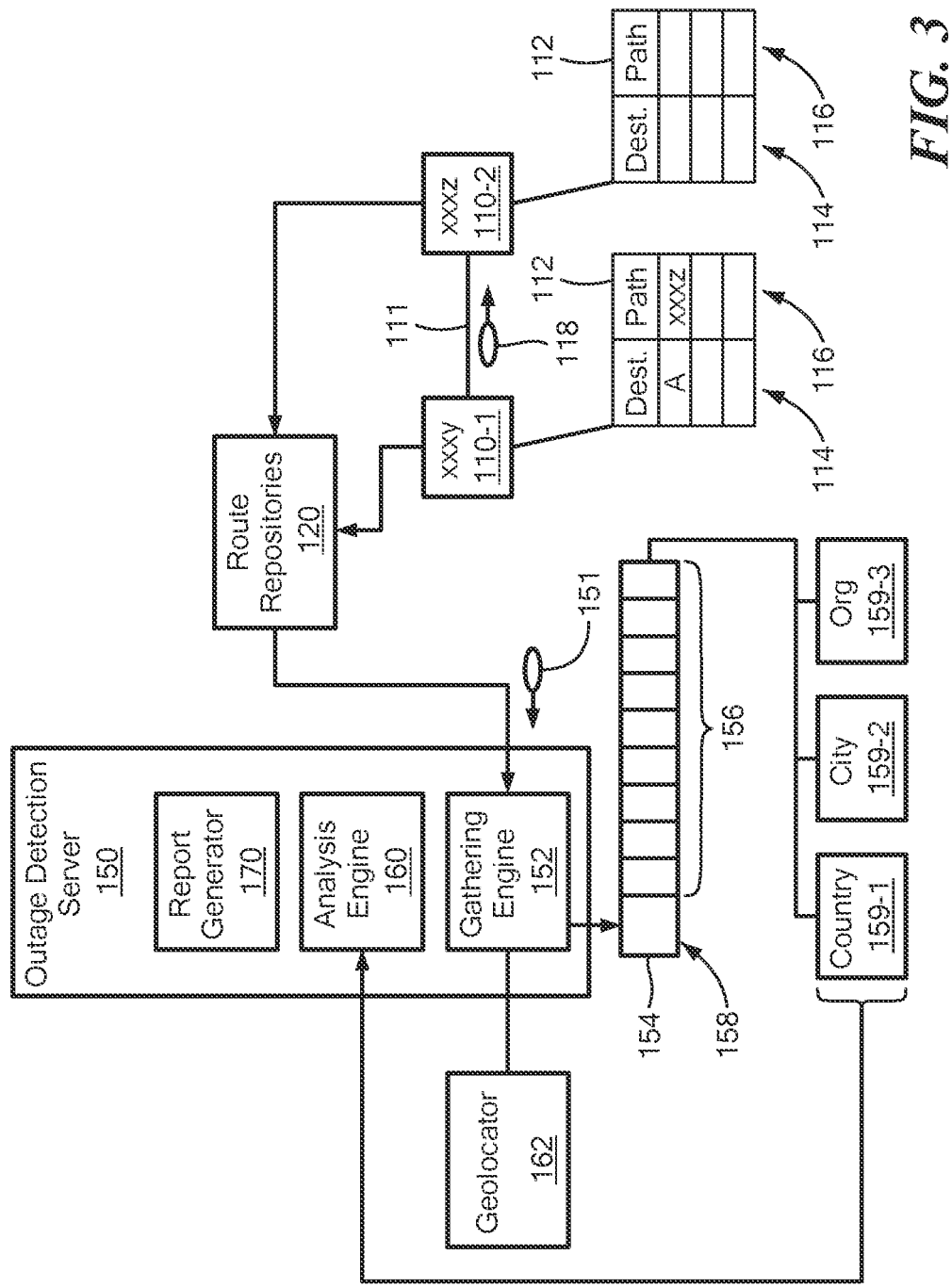
FIG. 3 is a data flow of the network interruption detection and identification approach of FIG. 2.

FIG. 3 is a data flow and block diagram of the network interruption detection and identification approach of FIG. 2. Referring to FIGS. 1-3, edge routers 110-1 . . . 110-2 (110 generally) couple via a network link 111. Each edge router 110 is connected to an autonomous system, or subnetwork having other nodes or devices corresponding to IP addresses or a range of IP addresses. Edge routers generally route message traffic to and from the AS that they serve, and act as transit routers for other traffic en route to another destination. A vast number of edge routers 110 and network links 111 exist. Each router has a routing table 112 containing entries for destination routes 114 and paths 116 indicative of other routers defining a path to the destination. BGP messages 118 are passed between the edge routers 110 as control messages for updating the routing tables 112. As indicated above, individual updates are normal and reflective of routine events such as routers being added and disconnected and minor disruptions between nodes. Routing repositories 120 such as RIPE NCC and Route Views also receive and aggregate the BGP messages and/or similar routing information for populating the routing path messages.

An outage detection server 150 includes a gathering engine 152 that receives routing path messages 151 from the routing repositories, available message traffic sensors and other suitable sources for storage in an anomaly database 154. In the anomaly database 154, the gathering engine 152 aggregates a set of historical routing path messages 156 indicative of previous anomalies, and a set of current routing path messages 158 indicative of current anomalies. The set of current and historical routing path messages are aggregated based on a time of receipt of the routing path messages 151, where the historical routing path messages 156 have an earlier time of receipt than the current routing path messages 158.

From the routing path messages in the anomaly database 154, an analysis engine 160 compares anomalies based on the set of current routing path messages 158 to the anomalies based on the set of historical routing path messages 156 for determining an increase in the anomalies in the set of current routing path messages. As alluded above, it is significant distinguish between minor increases attributable to normal network operation and evolution, and outliers indicative of a more widespread event.

For message intake, the gathering engine 152 identifies a time of each routing path message 151 of the plurality of routing path messages, and arranging the routing path messages into a sequence of bins defined by a timing interval based on the respective time of each routing path message 151. A typical bin may represent a 10 minute interval, for example, however any suitable bin granularity may be employed.

The gathering engine designates the bin corresponding to the most recently received routing path messages as current data defining the current routing path messages 158, and the remaining bins as historical data of historical routing path messages 156. In other words, the current data represents the most recent 10 minutes of network activity and the historical data covers the previous data. Typically a data window of about 2-3 hours of historical data is sufficient to provide a baseline of normal operation for identifying outliers or spikes in current operation. The analysis engine 160 identifies a disruption based on a deviation of the current data in the current bin with a sequence of the bins designated as historical data.

As discussed above, the routing path messages include BGP and CIDR messages in the disclosed examples. While BGP is a sophisticated protocol that denotes a range of content and format too complex to describe completely, the information employed herein pertains to destination IP address or ranges of addresses and the published routes to reach these destinations. An outage as detected herein would result in a relatively large number of routing paths seeking to avoid a particular router or region.

BGP messages denote several BGP states, and are identified by the edge routers on port 179. The first state is the Idle state. In the Idle state, BGP initializes all resources, refuses all inbound BGP connection attempts and initiates a TCP connection to the peer. The second state is Connect. In the Connect state, the router waits for the TCP connection to complete and transitions to the OpenSent state if successful. If unsuccessful, it starts the ConnectRetry timer and transitions to the Active state upon expiration. In the Active state, the router resets the ConnectRetry timer to zero and returns to the Connect state. In the OpenSent state, the router sends an Open message and waits for one in return in order to transition to the OpenConfirm state. Keepalive messages are exchanged and, upon successful receipt, the router is placed into the Established state. In the Established state, the router can send and receive: Keepalive; Update; and Notification messages to and from its peer.

BGP neighbors, or peers, are established by manual configuration among routers to create a TCP session on port 179. A BGP speaker sends 19-byte keepalive messages every 60 seconds to maintain the connection. Among routing protocols, BGP is unique in using TCP as its transport protocol.

In addition to identifying outages based on addresses referenced by BGP addresses, it is important to geolocate the affected IP addresses or range of addresses to report the affected location. A geolocation server 162 geolocates the routing path messages 151 based on a location of ASNs referenced in the routing path messages. A report generator 170 identifies, based on the geolocating, an internet entity affected by anomalies indicated by the routing path messages, and rendering an indication of the network disruption affecting the identified internet entity. The affected internet entities may define a geographical region, and may also identify particular entities such as large corporations having a reserved range of addresses.

Figure 4:
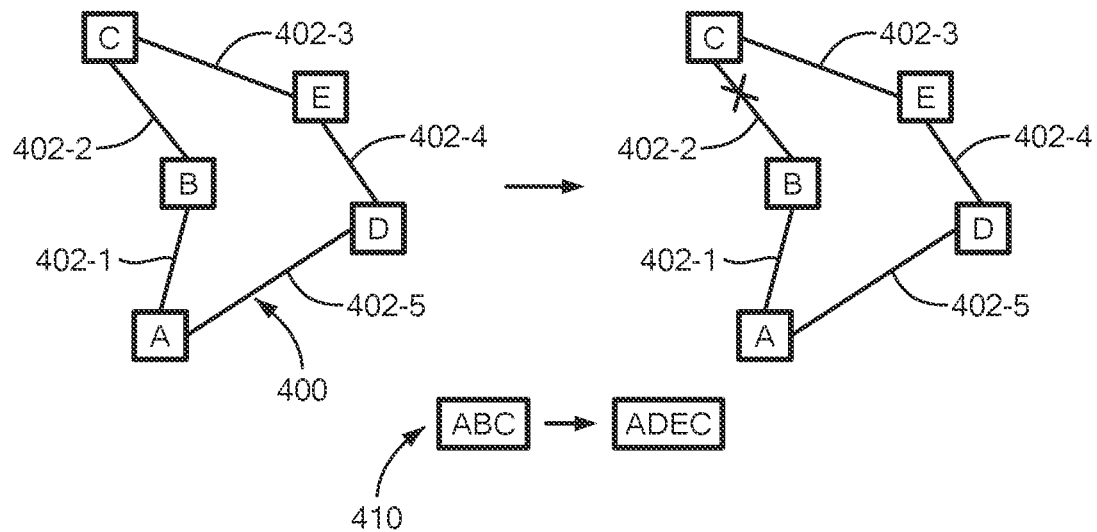
FIG. 4 is a schematic view of a network configuration having a detected interruption in the environment of FIG. 3.

FIG. 4 is a schematic view of a network configuration having a detected interruption in the environment of FIG. 3. In FIG. 4, an example network 400 includes routers A, B, C, D, and E, connected as shown by links 402-1 . . . 402-5. In analyzing a set of BGP messages 151, the analysis engine 160 identifies a subset of routing path messages pertaining to an internet entity, for example node C. The analysis engine 160 aggregates the plurality of routing path messages corresponding to the identified subset pertaining to node (router) C, and compares the anomalies for the aggregated routing path messages. The report generator 170 then renders a report, based on the comparison, as to whether a network disruption exists within the internet entity based on the identified subset.

In FIG. 4, a routing table entry 410 has a route from node A to C as A→B→C. Referring to FIGS. 3 and 4, a disruption develops in network link 402-2, between node B and C. In response, a routing path message 151 changes the advertised route between A and C to A→D→E→C as the new entry 410' that would be propagated by BGP messages. For performing the analysis, each subset is directed to an internet entity C, and identifies routing path messages as pertaining to one of the internet entities. For example, node C may be the edge router to a large autonomous system serving a city, state or large corporation. For each internet entity, the gathering engine maintains a table of corresponding routing path messages, such as tables 159-1 . . . 159-3 covering cities, states and organizations/corporations, respectively.

The geolocation server 162 may reference the CIDR messages for correlating IP addresses with geographic references. CIDR blocks generally may not contain information about their relationship to each other (geographical, relational, or otherwise), but we know some disruptions are related by geography (natural disasters) and organization. To account for this, the gathering engine 152 attaches country, city, and AS information to the CIDR blocks to obtain a dataset of shape entity (country/city/AS) by feature by time. Following this, the features are stacked after this joining, incorporating geographic relationships into the dataset.

Figure 5:
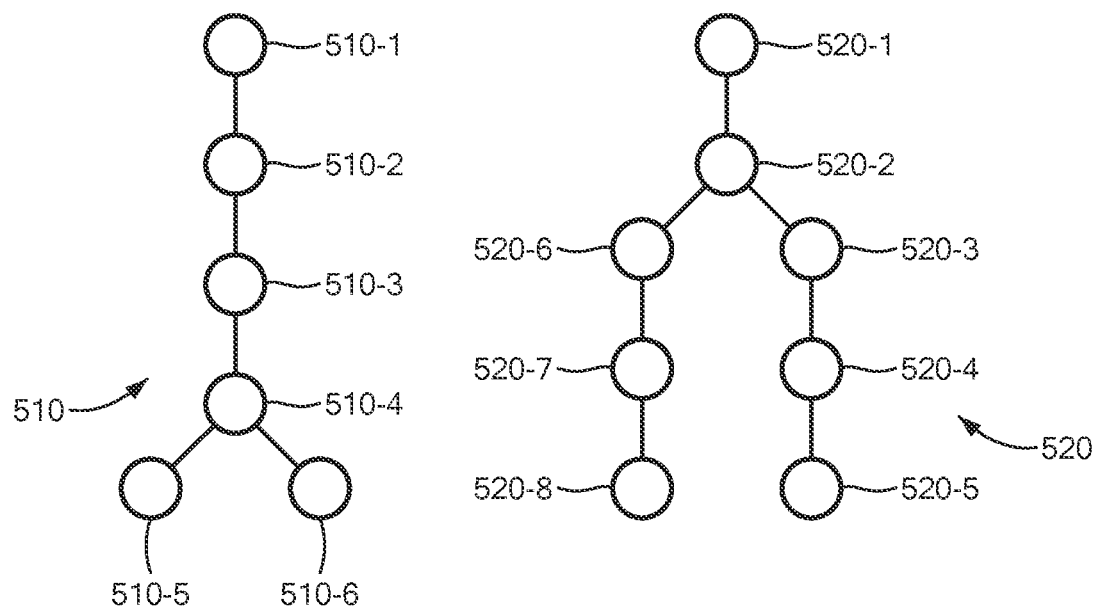
FIG. 5 is a schematic diagram of an isolation forest depicted in the interruption detection of FIGS. 2 and 3.

FIG. 5 is a schematic diagram of an isolation forest depicted in the interruption detection of FIGS. 2 and 3.

Referring to FIGS. 1-5, the analysis engine 160 employs detection logic including machine learning for identifying a normal level of anomalies or disruptions, and identifying when an outlier of normal performance indicates a larger scale outage. In an example arrangement, the analysis engine 160 builds a node structure representative of the paths depicted in the routing path messages. It performs a traversal of the node structure of the routing path messages 151, and determines a deviation in a traversed node structure corresponding to a first time interval of the plurality of time intervals from a traversed node structure corresponding to a second time interval, such as when the current routing path messages 158 deviate from the historical routing path messages 156. The analysis engine 160 concludes the status of the network disruption based on a distance traversed in the traversed node structures until the deviation in the traversed node structures of the first and second time intervals.

FIG. 5 shows a simplified example of an isolation forest illustrating the approach of the analysis engine 160. Graph 510 depicts an isolation forest representing features from one interval of routing messages, and graph 520 represents features from another interval of routing messages. Note that the apparent node structure is not the connectivity of node links 402 as in FIG. 4, but rather the isolation forest derived from features of the gathered routing path messages 151, which may be voluminous. An example list of various features is listed in Table I.

TABLE 1

Feature Descriptions:

dump_type - whether the record is an update of part of a router information broadcast base
utype - announcing a path (A) or withdrawing a path (W)
ts - timestamp GMT/UTC
datetime - human-interpretable timestamp
project - {RouteViews or RIPE}
collector - the name of the sensor recording the broadcast
peer_asn - the ASN making the announcement
peer_ip - the specific IP making the announcement
origin_cidr - the announcement is about this CIDR block
next_hop_ip
path_to_origin_asn - the ASN path to get from the origin ASN to the peer ASN
origin_asn - the announcement is about this ASn
communities_asn - ASNs in the same community
old_state
new_state
len_path_to_origin_asn - length of the path listed
len_communities_asn - number of communities listed Using the example bins of messages 154 discussed above, at this stage, we have a dataset of aggregated features, binned by 10-minute time intervals. We make the assumption that normalizing the data to highlight potential network disruptions will allow machine learning models to better discriminate. To that end we employ the anomaly detection technique Isolation Forest. In contrast to conventional approaches, transformation/normalization techniques (e.g. min-max scaling) weren't chosen here, as we needed to take past states/features into consideration as well. An isolation forest representation allows for this, as we can "train" using the past states (previous 3 hours) and "predict" on the current 10-minute bin. We (horizontally) stack the results to produce a dataset of shape number-of-CIDRs by 10-min bins, where the values are in {0-normal, 1-anomaly}.

Decision trees and random forests are one approach to modeling and comparing different features for determining similarity and deviations. Isolation Forests are a modification of the machine learning framework of Random Forests and Decision Trees. Decision Trees attempt to separate different objects (classes), by splitting features in a tree-like structure until all of the leaves have objects of the same class. Random Forests improve upon this by using, not one, but several different Decision Trees (that together make a forest) and then combines their results together. An Isolation Forest is the anomaly detection version of this, where several Decision Trees keep splitting the data until each leaf has a single point. This algorithm uses "the average number of splits until a point is separated" to determine how anomalous a CIDR block is (the less splits required, the more anomalous).

An isolation forest operates as an outlier detection mechanism, where a number of path splits are needed to isolate a given point or leaf. The easier a leaf is to isolate, the greater the chance it defines an outlier. Referring to FIG. 5, the analysis engine 160 generates node structures 510, 520, which each define an isolation forest for evaluating the structure for determining a similarity in routing paths. The analysis engine 160 defines a plurality of decision trees based on routing paths indicative of a sequence of autonomous systems for satisfying a plurality of routes to a destination. Analysis includes splitting the decision trees until each respective decision tree has a terminal leaf node, and identifying, based on an average number of splits until a terminal leaf node is attained, whether the decision tree is indicative on an anomaly. In FIG. 5, graph 510 does not experience a split (divergence) until node 510-4, indicating a greater similarity than graph 520, where a divergence occurs at node 520-2.

The analysis engine 160 builds the node structure 510, 520 based on a plurality of features from the routing path messages 151, and arranging the node structure based on similarities in the features from the routing path messages. It then determines a disruption based on a detection of outliers in the features of routing path messages corresponding to a current time interval defined by the current routing path messages 158.

Figure 6:
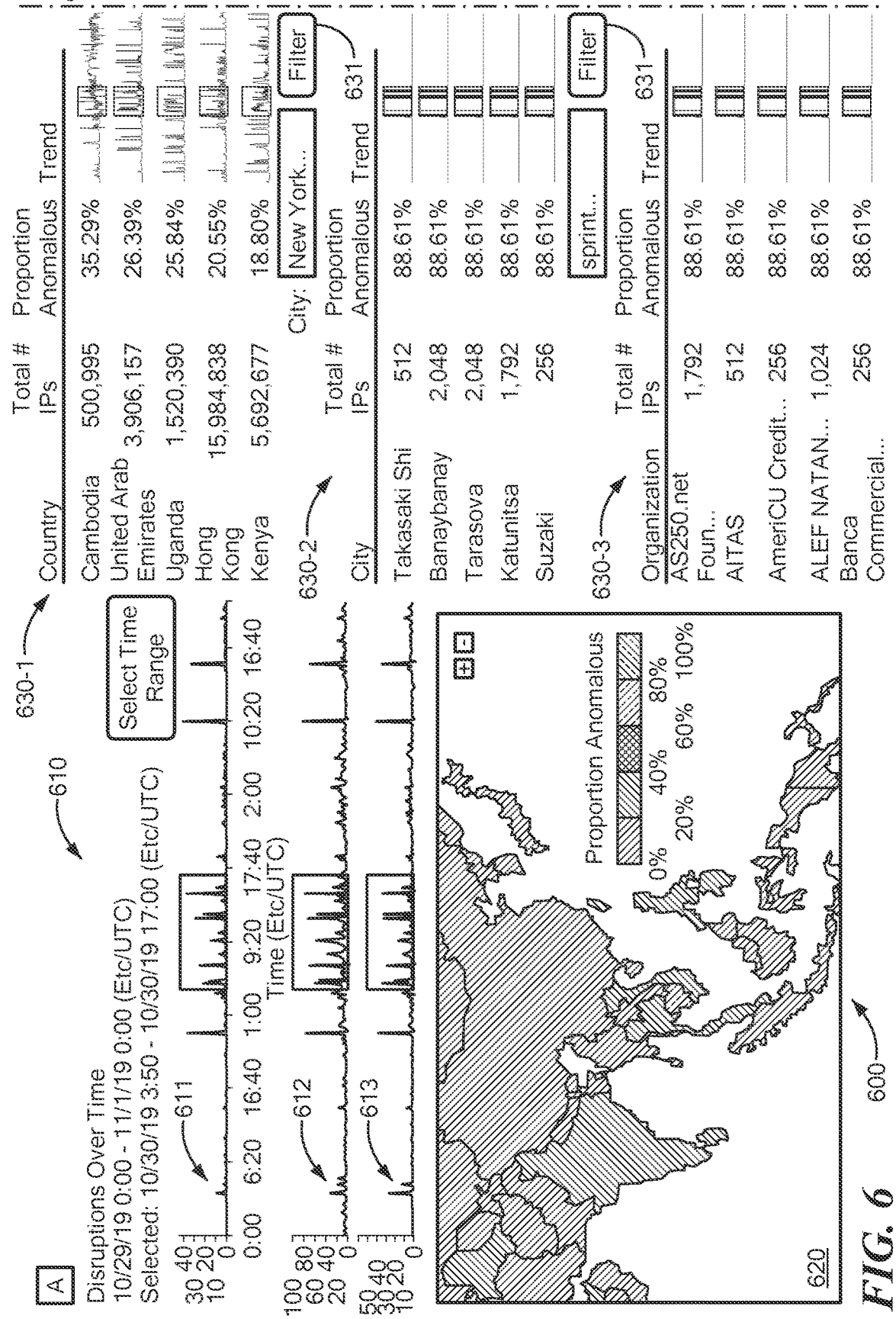
FIG. 6 is an example of interruption detection rendering resulting from the detection of FIGS. 2-3 on a GUI.
Figure 6:
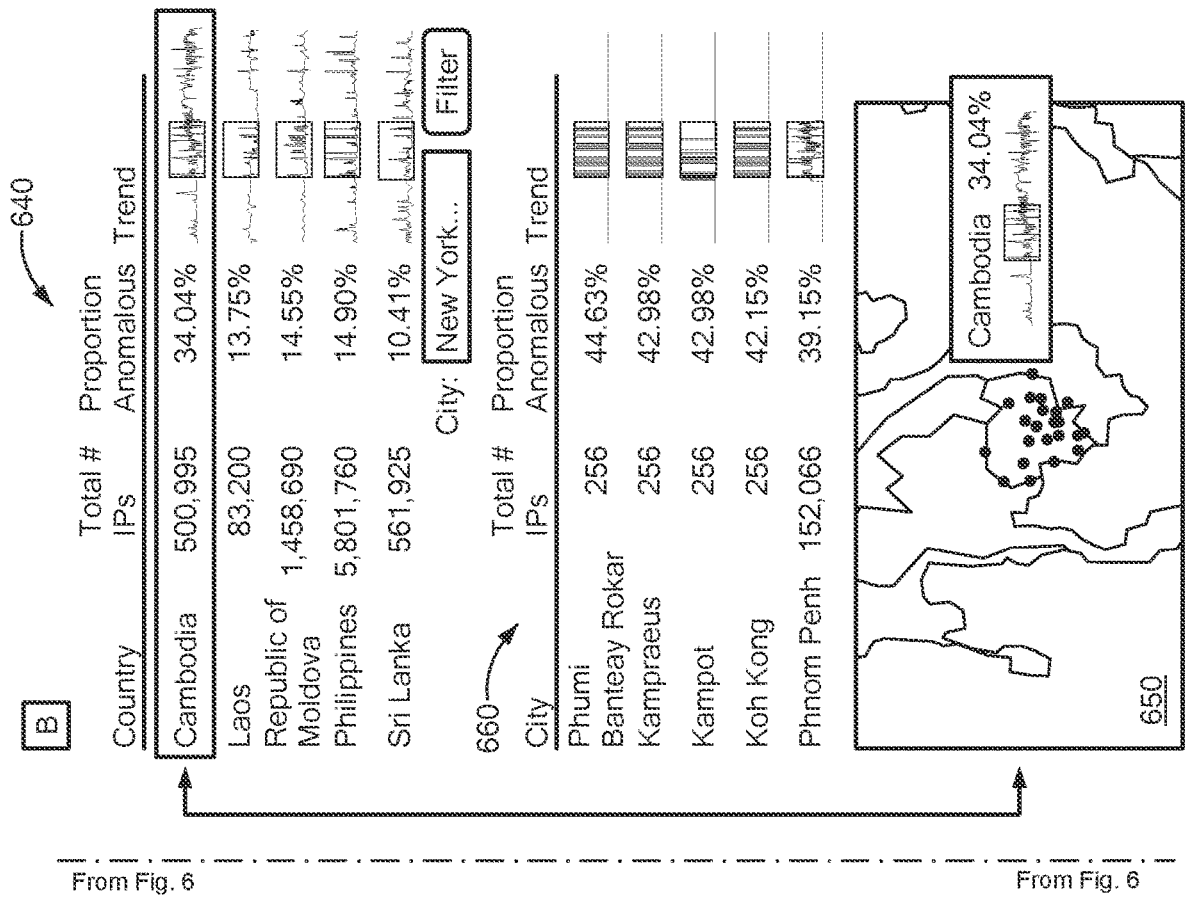

FIG. 6 is an example of interruption detection rendering resulting from the detection of FIGS. 2-3 on a GUI. Referring to FIGS. 1-6, the outage report may take several forms, generally used to populate the rendering screen 118 with results via a rendered GUI. For example, outage detection server 150 receives the user request 102 for network disruptions affecting a queried internet entity, in which the user request is indicative of a geographic region. Alternatively, the user request may seek any geographic area potentially experiencing disruption. The outage detection server 150 determines, based on the table 159 of routing path messages corresponding to the queried internet entity in the user request 102, whether a network disruption exists for the queried internet entity.

Several types of entities and corresponding tables 159 may be analyzed by the analysis engine 160. FIG. 6 presents a dashboard approach with three main components. A time disruptions window 610 shows graphs for disruptions over time. The uppermost time series chart 611 shows a count of affected Internet Protocol (IP) addresses over a given time range. This chart has an interactive brush that users can use to drill down to smaller time slices, updating the other dashboard components to display data from the selected sub time range. Beneath the affected IP time series chart are two more time series charts: a first chart 612 shows a count of affected cities over time, and a second chart 613 shows a count of affected organizations over time. These two charts have highlighted regions that indicate the selected sub time range.

A geographic disruptions window 620 shows a choropleth (or alternatively, greyscale) map showing the proportion of anomalous IP addresses to total number of IP addresses for countries ("proportion anomalous") for the given sub time range. The user can select a country and the top 1000 affected cities within that country are added to the map. When the country is deselected those cities are removed from the map. When a user hovers over a country polygon or a city circle, they can see its name and its average proportion anomalous over the sub time range in a tool tip or text box.

The center column includes windows 630-1, 630-3 (630) generally corresponding to the internet entity tables 159-1.159-3. A country window 630-1 includes selected countries from the window 620. When hovering over a country, a tool-tip also includes a trend line showing the change in the country's proportion anomalous over the overall time range in a country breakdown window 640. This allows users to quickly compare disruption patterns between neighboring countries to identify geographic disruption trends. A map window 650 renders outages at the city/town level showing the same choropleth pattern as the map 620.

The three entity tables address countries 630-1, cities 630-2 and organizations 630-3 of adjustable length. For each row, there is the entity name, total number of IP addresses affected, proportion anomalous, and a trend line showing change in proportion anomalous for the overall time range. The table rows are ordered by proportion anomalous. The top cities and top organizations tables have search bars 631 for filtering on entity name, allowing users to find a specific entity that might not appear in the table. When a user clicks on a row in the top countries table, the map zooms to that country, and the top 1000 affected cities in that country are added to the map and to the top cities table. The country table 630-1 is also reordered by similarity to the selected country's trend line 640. This is useful for identifying countries that have experienced similar disruption patterns. A Cities-country window 660 breaks down the selected country (Cambodia) by city.

In the given example, the time series charts 611-613 showing change in count of disrupted IP addresses, cities, and organizations in Cambodia. The choropleth map 620 shows a proportion of anomalous IP addresses for all countries. The entity tables 630 are arranged showing top five affected countries, cities, and organizations. Top countries 640 and top cities 660 and map 650 are shown after Cambodia has been selected, and the map 650 shows affected cities in Cambodia.

Figure 7:
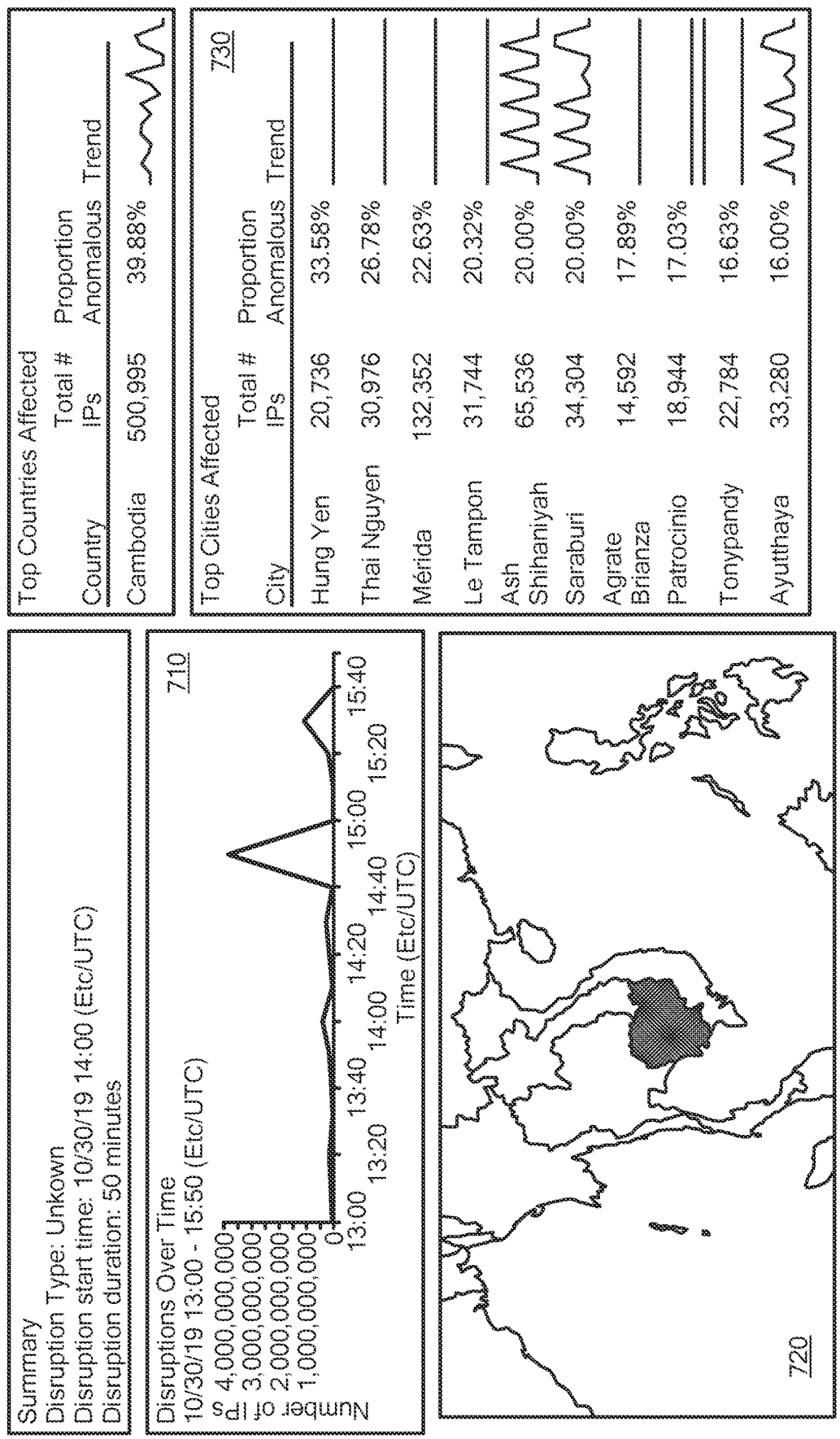
FIG. 7 is a GUI rendering of supporting data and information for the interruption detection in FIG. 6.

FIG. 7 is a GUI rendering of supporting data and information for the interruption detection in FIG. 6. FIG. 7 shows a rendering screen 700 for a report mode where it shows the disruptions detailed in a report from the disruption report generator 170. The report interface is a simplified version of the dashboard that allows users to quickly understand what occurred during a disruption event by streamlining information. A disruption event report can be generated manually by developers or automatically by the system, via the dynamic template, based on a certain threshold of variation in the current to historical anomalies. By default each report contains a time series chart displaying the number of anomalous IP addresses and a disruption summary text. The report template dynamically adds relevant components, so reports may contain additional time series charts, tables, and/or a map depending on the disruption.

The example in FIG. 7 follows by drilling down from FIG. 6 by querying a specific network event affecting Cambodia between 13:00 and 15:40 on Oct. 30, 2019. An expanded time window 710 narrows the queried timeline. The map window 720 focuses on the affected region, and the cities window 730 shows the most affected cites for the narrowed time range in question. This rendering 700 can be employed for defining outages according to rules such as concluding that a disruption exists based on an increase of at least 20% in anomalies in a ten minute period over anomalies in an immediately preceding 3 hour period.

Using the data presented in the dashboard, the outage detection server 150 can identify whether geopolitical entities (e.g. countries, states, counties, or cities) or organizations (e.g. internet service providers) are experiencing disruption. Several hypothetical examples of outage detection are as follows:

To determine if an individual entity is experiencing disruption:
  Method 1: A geopolitical entity or organization whose mean percent disruption for at least 10 minutes is at least 20% higher than the mean percent disruption for the preceding or following 3 hours.
  Method 2: Compute the mean percent disruption for the given entity for the previous 24 hours. Then for each percent disruption measurement for the previous 3 hours compute a new value which is either the percent disruption at that moment in time minus the mean percent disruption, or zero, whichever is greater. The entity is disrupted if the new value is greater than 20% for more than 10 minutes during the previous 3 hours.
  Method 3: Compute the total percent disruption of all IP addresses for the previous 3 hours. Then for a given entity for each percent disruption measurement for the previous 3 hours compute a new value which is either the percent disruption of the given entity at that moment in time minus the total percent disruption of all IP addresses for that moment in time, or zero, whichever is greater. The entity is disrupted if the new value is greater than 20% for more than 10 minutes during the previous 3 hours.

In the case of a geographic patterns of disruption:
  Region of disruption. A group of adjacent geopolitical boundaries (e.g. countries, states, counties, or cities) where their percent disruption is 20% higher than other areas on the map.
  Trail of disruption. One or more adjacent geopolitical boundaries (e.g. countries, states, counties, or cities) where their percent disruption is 20% higher than other areas on the map, and a neighboring geopolitical boundary experienced or is experiencing a disruption within the previous 6 hours.

In the case of temporal patterns:
  Multiple simultaneous disruptions. A group (more than one) of geopolitical entities or organizations is experiencing a disruption (e.g. as defined in "Individual entity disruption") and the percent disruption for one entity in the group is deemed similar to another entity in the group using the following method: For the same 3-hour time window, the mean absolute difference for each percent disruption measurement within that window is less than 10%.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as solid state drives (SSDs) and media, flash drives, floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions, including virtual machines and hypervisor controlled execution environments. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method of identifying and reporting network anomalies, comprising:
  receiving a plurality of routing path messages of advertised routes in a network, the routing path messages indicative of available network paths between network entities;
  identifying an anomaly in an available network path indicative of a change to an advertised route, the anomaly causing network traffic between autonomous systems (AS) to follow a different path;
  aggregating the plurality of routing path messages defining an anomaly received during a plurality of time intervals;
  comparing the anomalies in each time interval of the plurality of time intervals to the anomaly in the others of the plurality of time intervals by:
    building a node structure defining an isolation forest representative of the paths depicted in the routing path messages;
    traversing the node structure; and
    concluding, based on the comparison, whether a difference in the anomalies is indicative of a network disruption by:
      defining a plurality of decision trees based on routing paths indicative of a sequence of autonomous systems for satisfying a plurality of routes to a destination;
      splitting the decision trees until each respective decision tree has a terminal leaf node; and
      identifying, based on an average number of splits until a terminal leaf node is attained, whether the decision tree is indicative of an anomaly.

2. The method of claim 1 further comprising:
  determining a deviation in a traversed node structure corresponding to a first time interval of the plurality of time intervals from a traversed node structure corresponding to a second time interval; and
  concluding the status of the network disruption based on a distance traversed in the traversed node structures until the deviation in the traversed node structures of the first and second time intervals.

3. The method of claim 1 further comprising:
  identifying a subset of routing path messages pertaining to an internet entity;
  aggregating the plurality of routing path messages corresponding to the identified subset;

comparing the anomalies for the aggregated routing path messages; and reporting, based on the comparison, whether a network disruption exists within the internet entity based on the identified subset.

4. The method of claim 3 wherein each subset is directed to an internet entity, further comprising:

identifying routing path messages as pertaining to one of the internet entities; and for each internet entity, maintaining a table of corresponding routing path messages.

5. The method of claim 1 further comprising:

aggregating a set of historical routing path messages indicative of previous anomalies;

aggregating a set of current routing path messages indicative of current anomalies, the set of current and historical routing path messages aggregated based on a time of receipt of the plurality of routing path messages, the historical routing path messages having an earlier time of receipt than the current routing path messages; and comparing anomalies based on the set of current routing path messages to the anomalies based on the set of historical routing path messages for determining an increase in the anomalies in the set of current routing path messages.

6. The method of claim 1 wherein:

the routing path messages include Border Gateway Protocol (BGP) messages indicative of paths between a plurality of autonomous systems (AS), and Classless Inter-Domain Routing (CIDR) messages indicative of ranges of internet addresses sharing a routing path, further comprising at least one of:

determining an anomaly from a change in an availability of a path to a destination AS of the plurality of autonomous systems; and determining an anomaly from a change in a range of internet addresses reachable by routing through a transit AS of the plurality of autonomous systems.

7. The method of claim 2 further comprising:

identifying a time of each routing path message of the plurality of routing path messages;

arranging the routing path messages into a sequence of bins defined by a timing interval based on the respective time of each routing path message;

designating the bin corresponding to the most recently received routing path messages as current data and the remaining bins as historical data;

identifying a disruption based on a deviation of the current data in the current bin with a sequence of the bins designated as historical data.

8. The method of claim 2 further comprising:

building the node structure based on a plurality of features from the routing path messages;

arranging the node structure based on similarities in the features from the routing path messages;

determining a disruption based on a detection of outliers in the features of routing path messages corresponding to a current time interval.

9. The method of claim 2 further comprising:

geolocating the routing path messages based on a location of Autonomous System Numbers (ASNs) referenced in the routing path messages;

identifying, based on the geolocating, an internet entity affected by anomalies indicated by the routing path messages; and rendering an indication of the network disruption affecting the identified internet entity.

10. The method of claim 9 wherein the affected internet entity is a geographical region.

11. The method of claim 4 further comprising:

receiving a user request for network disruptions affecting a queried internet entity, the user request indicative of a geographic region;

determining, based on the table of routing path messages corresponding to the queried internet entity in the user request, whether a network disruption exists for the queried internet entity.

12. The method of claim 5 further comprising:

concluding that a disruption exists based on an increase of at least 20% in anomalies in a ten minute period over anomalies in an immediately preceding 3 hour period.

13. The method of claim 1 wherein receiving the routing path messages further comprises receiving routing path messages derived from a network layer common to the other received routing path messages.

14. An internet outage detection server device, comprising:

an interface to a public access network configured to receive a plurality of routing path messages of advertised routes in a network, the routing path messages indicative of available network paths between network entities;

an analysis engine to identify an anomaly in an available network path indicative of a change to an advertised route, the anomaly causing network traffic between autonomous systems (AS) to follow a different path;

a gathering engine to aggregate the plurality of routing path messages defining an anomaly received during a plurality of time intervals;

analysis logic in the analysis engine to compare the anomalies in each time interval of the plurality of time intervals to the anomaly in the others of the plurality of time intervals, the analysis logic configured to:

build a node structure defining an isolation forest representative of the paths depicted in the routing path messages; and traverse the node structure; and a report generator to render an indication of, based on the comparison, whether a difference in the anomalies is indicative of a network disruption, the analysis logic further configured to evaluate the node structure for determining a similarity in routing paths by defining a plurality of decision trees based on routing paths indicative of a sequence of autonomous systems for satisfying a plurality of routes to a destination;

split the decision trees until each respective decision tree has a terminal leaf node; and identify, based on an average number of splits until a terminal leaf node is attained, whether the decision tree is indicative on an anomaly.

15. The device of claim 14 further comprising:

a memory for storing a node structure representative of the paths depicted in the routing path messages;

the analysis logic further configured to traverse the node structure of a plurality of routing path messages, and to determine a deviation in a traversed node structure corresponding to a first time interval of the plurality of time intervals from a traversed node structure corresponding to a second time interval; and the analysis logic configured to render the status of the network disruption based on a distance traversed in the traversed node structures until the deviation in the traversed node structures of the first and second time intervals.

16. The device of claim 14 wherein the analysis logic is further configured to:
identify a subset of routing path messages pertaining to an internet entity;
aggregating the plurality of routing path messages corresponding to the identified subset; and
compare the anomalies for the aggregated routing path messages, the report generator responsive to the analysis logic to report, based on the comparison, whether a network disruption exists within the internet entity based on the identified subset.

17. The device of claim 14 wherein the gathering engine is configured to:
aggregate a set of historical routing path messages indicative of previous anomalies;
aggregate a set of current routing path messages indicative of current anomalies, the set of current and historical routing path messages aggregated based on a time of receipt of the plurality of routing path messages, the historical routing path messages having an earlier time of receipt than the current routing path messages; wherein
the analysis logic is further configured to compare anomalies based on the set of current routing path messages to the anomalies based on the set of historical routing path messages for determining an increase in the anomalies in the set of current routing path messages.

18. The device of claim 14 wherein:
the routing path messages include Border Gateway Protocol (BGP) messages indicative of paths between a plurality of autonomous systems (AS), and Classless Inter-Domain Routing (CIDR) messages indicative of ranges of internet addresses sharing a routing path, the analysis logic further configured to
determine an anomaly from a change in an availability of a path to a destination AS of the plurality of autonomous systems; and
determine an anomaly from a change in a range of internet addresses reachable by routing through a transit AS of the plurality of autonomous systems.

19. A computer program embodying program code on a non-transitory medium that, when executed by a processor, performs steps for implementing a method for identifying and reporting network anomalies, the method comprising:
receiving a plurality of routing path messages indicative of a change to an advertised route, the routing path messages indicative of available network paths between network entities;
identifying an anomaly in an available network path indicative of a change to an advertised route, the anomaly causing network traffic between autonomous systems (AS) to follow a different path;
aggregating the plurality of routing path messages defining an anomaly received during a plurality of time intervals;
comparing the anomalies in each time interval of the plurality of time intervals to the anomaly in the others of the plurality of time intervals by:
building a node structure defining an isolation forest representative of the paths depicted in the routing path messages; and
traversing the node structure; and
concluding, based on the comparison, whether a difference in the anomalies is indicative of a network disruption by:
defining a plurality of decision trees based on routing paths indicative of a sequence of autonomous systems for satisfying a plurality of routes to a destination;
splitting the decision trees until each respective decision tree has a terminal leaf node; and
identifying, based on an average number of splits until a terminal leaf node is attained, whether the decision tree is indicative on an anomaly.

* * * * *